US012746783B2

(12) United States Patent
Horiuchi

(10) Patent No.: US 12,746,783 B2
(45) Date of Patent: Sep. 29, 2026

(54) PNEUMATIC TIRE

(71) Applicant: The Yokohama Rubber Co., LTD., Tokyo (JP)

(72) Inventor: Kenji Horiuchi, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 69 days.

(21) Appl. No.: 17/275,014

(22) PCT Filed: Sep. 11, 2019

(86) PCT No.: PCT/JP2019/035721
§ 371 (c)(1),
(2) Date: Mar. 10, 2021

(87) PCT Pub. No.: WO2020/054767
PCT Pub. Date: Mar. 19, 2020

(65) Prior Publication Data

US 2022/0063349 A1 Mar. 3, 2022

(30) Foreign Application Priority Data

Sep. 13, 2018 (JP) ................................ 2018-171728

(51) Int. Cl.
*B60C 13/02* (2006.01)
*B60C 11/01* (2006.01)
*B60C 13/00* (2006.01)

(52) U.S. Cl.
CPC .............. *B60C 13/02* (2013.01); *B60C 11/01* (2013.01); *B60C 13/00* (2013.01); *B60C 2200/14* (2013.01)

(58) Field of Classification Search
CPC ..... B60C 11/01; B60C 11/0304; B60C 13/02; B60C 2200/14
See application file for complete search history.

(56) References Cited

U.S. PATENT DOCUMENTS

2010/0038001 A1 2/2010 Yamaguchi
2015/0059942 A1* 3/2015 Takei ................. B60C 11/1376 152/209.16
2017/0057296 A1 3/2017 Takemori
2017/0096033 A1 4/2017 Taniguchi
2020/0055346 A1* 2/2020 Murata .................. B60C 13/02

FOREIGN PATENT DOCUMENTS

CN 101631686 A 1/2010
CN 106457916 A 2/2017
DE 102016117823 A 9/2016
(Continued)

*Primary Examiner* — Justin R Fischer
*Assistant Examiner* — Philip N Schwartz
(74) *Attorney, Agent, or Firm* — Thorpe North & Western

(57) ABSTRACT

A pneumatic tire includes a plurality of side blocks rising from an outer surface of a sidewall portion and defined by a segmentation element in each of side regions adjacent to an outer side in a tire width direction of an outermost end portion in the tire width direction of a tread portion. The number of the side blocks provided in an inner side region that is an inner side with respect to a vehicle when a tire is mounted on the vehicle is smaller than the number of the side blocks provided in an outer side region that is an outer side with respect to the vehicle when the tire is mounted on the vehicle.

14 Claims, 3 Drawing Sheets

(56) References Cited

FOREIGN PATENT DOCUMENTS

| | | | | | |
|---|---|---|---|---|---|
| EP | 2141031 | A1 | | 1/2010 | |
| JP | 2001-130223 | A | | 5/2001 | |
| JP | 2010-188975 | A | | 9/2010 | |
| JP | 2013-119277 | A | | 6/2013 | |
| JP | 2016-007861 | A | | 1/2016 | |
| JP | 2016-155504 | A | | 9/2016 | |
| JP | 2017-71281 | A | | 4/2017 | |
| JP | 2018114811 | A | * | 7/2018 | ............. B60C 11/01 |
| KR | 10-2009-0113332 | A | | 10/2009 | |
| WO | WO-9746359 | A1 | * | 12/1997 | ......... B60C 11/0304 |
| WO | 2008/114668 | A1 | | 9/2008 | |
| WO | 2015/166802 | A1 | | 11/2015 | |

* cited by examiner

PNEUMATIC TIRE

TECHNICAL FIELD

The present technology relates to a pneumatic tire suitable as a tire for driving on unpaved roads and particularly relates to a pneumatic tire that provides improved noise performance and running performance on unpaved roads.

BACKGROUND ART

As a pneumatic tire used for running on unpaved roads such as uneven ground, muddy ground, snowy roads, sandy ground, and rocky ground surfaces, a tire that includes a tread pattern mainly including a lug groove or a block including a large number of edge components and that has a large groove area is generally adopted. Additionally, a side block is provided in a side region disposed further on an outer side in a tire width direction than a shoulder block located on an outermost side in the tire width direction of a tread portion. In such a tire, traction performance is obtained by biting mud, snow, sand, stones, rocks, or the like on a road surface (hereinafter, referred to collectively as "mud or the like") and also clogging of a groove with mud or the like is prevented, and running performance on unpaved roads is improved (for example, see Japan Unexamined Patent Publication Nos. 2016-007861 and 2013-119277).

Compared with the tires of Japan Unexamined Patent Publication Nos. 2016-007861 and 2013-119277, the tire of Japan Unexamined Patent Publication No. 2016-007861 can be said to be a type of tire that has relatively small groove area and that is also designed in consideration of running performance on paved roads. On the other hand, the tire of Japan Unexamined Patent Publication No. 2013-119277 is a type of tire that has a large groove area and includes a large individual block, and that is designed particularly in consideration of running performance on unpaved roads. Thus, the former has poorer running performance on unpaved roads than the running performance of the latter, and the latter tends to have poorer performance under normal travel conditions than the performance of the former. In recent years, performance requirements for a tire have become diverse, and a tire for driving on unpaved roads that has an intermediate level of performance between the two types of tires has been demanded, and measures to efficiently enhance running performance on unpaved roads with a suitable groove shape has been demanded. Additionally, as described above, basically, a tire for driving on unpaved roads mainly include a block and has a large groove area, and thus noise performance (for example, wind noise) tends to easily degrade. Thus, good maintenance and improvement of noise performance is also demanded.

SUMMARY

The present technology provides a pneumatic tire that provides improved noise performance and running performance on unpaved roads.

A pneumatic tire of an embodiment of the present technology includes: a tread portion extending in a tire circumferential direction and having an annular shape; a pair of sidewall portions respectively disposed on both sides of the tread portion; and a pair of bead portions each disposed on an inner side of the pair of sidewall portions in a tire radial direction, the pneumatic tire having a designated mounting direction with respect to a vehicle; a plurality of side blocks being arranged along the tire circumferential direction in each of side regions adjacent to an outer side in a tire width direction of an outermost end portion in the tire width direction of the tread portion, the side blocks rising from outer surfaces of the sidewall portions and defined by a segmentation element, the segmentation element being a combination of elements selected from the outermost end portion in the tire width direction of the tread portion, a groove extending in the tire circumferential direction or the tire width direction, and a sipe extending in the tire circumferential direction or the tire width direction, and assuming that, among the side regions, a side that is an inner side with respect to the vehicle when the pneumatic tire is mounted on the vehicle is an inner side region, and a side that is an outer side with respect to the vehicle when the pneumatic tire is mounted on the vehicle is an outer side region, the number Nin of the side blocks provided in the inner side region being smaller than the number Nout of the side blocks provided in the outer side region.

In an embodiment of the present technology, as described above, a plurality of side blocks are provided in side regions that come into contact with the ground when a tire is buried in mud or the like, or when a vehicle body is tilted, and the number Nout of the side blocks in an outer side region having a large effect on noise (wind noise) is relatively large (that is, the individual blocks are small), and thus noise performance can be enhanced. Additionally, since the number of groove components is increased, running performance on unpaved roads (particularly snow-covered road surfaces) can also be improved. On the other hand, since the number Nin of the side blocks in an inner side region having a small effect on noise (wind noise) is relatively small (that is, the individual blocks are large), cut resistance can be enhanced, and accordingly running performance on unpaved roads can be improved. Particularly, on unpaved roads, the tire is sunk or the vehicle body is tilted, and a cut is likely to occur even on a vehicle inner side that is not exposed to a vehicle outer side, and thus cut resistance can be improved effectively. Functions are shared on the vehicle inner side and the vehicle outer side in this manner, and thus noise performance and running performance on unpaved roads can be provided in a well-balanced manner.

In an embodiment of the present technology, preferably, the side blocks adjacent in the tire circumferential direction at least partially overlap as viewed along a tire radial direction. The side blocks are disposed in this manner, and thus the side blocks are present over the entire circumference of the tire, and this becomes advantageous in improving running performance on unpaved roads.

In an embodiment of the present technology, preferably, the number Nin of the side blocks provided in the inner side region is not less than 25, and a ratio Nout/Nin of the number Nout of the side blocks provided in the outer side region to the number Nin of the side blocks provided in the inner side region is not less than 1.5 and not greater than 3.5. Accordingly, a balance of the number and the size of the side blocks on each of the sides becomes good, and this becomes advantageous in providing noise performance and running performance on unpaved roads in a compatible manner.

In an embodiment of the present technology, preferably, a ratio L/SH of a vertical distance L from the outermost end portion in the tire width direction of the tread portion to an innermost point in the tire radial direction of the side region to a tire cross-sectional height SH is from 0.10 to 0.30. The range of the side regions provided with the side blocks is set in this manner, and thus the side blocks appropriately come into contact with a road surface (mud or the like or rocks)

during running on unpaved roads, and this becomes advantageous in effectively exerting running performance on unpaved roads.

In an embodiment of the present technology, preferably, a rising height H of the side blocks from the outer surfaces of the sidewall portions is from 5 mm to 13 mm. Accordingly, the side blocks sufficiently rise and have an appropriate size, and thus this becomes advantageous in improving running performance on unpaved roads.

In an embodiment of the present technology, preferably, the segmentation element partially includes a shallow grooved region having a relatively small groove depth, the groove depth of the shallow grooved region is from 40% to 45% of the rising height H of the side blocks from the outer surfaces of the sidewall portions, and a total length of the shallow grooved region along a contour line of a road contact surface of the side blocks is from 15% to 35% of an entire length of the contour line of the road contact surface of the side blocks. Accordingly, groove volume and block rigidity can be ensured in a well-balanced manner, and this becomes advantageous in providing noise performance and running performance on unpaved roads in a compatible manner.

In an embodiment of the present technology, preferably, the total area of the side blocks provided in the outer side region is from 85% to 115% of the total area of the side blocks provided in the inner side region. In this manner, the total area of the side blocks is set to be an identical extent on the vehicle inner side and the vehicle outer side, and thus a balance between groove volume and block rigidity can be enhanced effectively by the relationship between the number of the side blocks on the vehicle inner side and the number of the side blocks on the vehicle outer side, and this becomes advantageous in providing noise performance and running performance on unpaved roads in a compatible manner.

In an embodiment of the present technology, preferably, in each of the inner side region and the outer side region, a percentage of the total area of the side blocks provided in each of the side regions with respect to the area of each of the side regions is from 15% to 70%. Accordingly, since the side blocks can be ensured sufficiently in each of the side regions, this becomes advantageous in improving running performance on unpaved roads.

In an embodiment of the present technology, "ground contact edge" refers to both end portions in a tire axial direction of a ground contact region formed when a tire is vertically placed on a flat surface in a state where the tire is mounted on a regular rim and inflated to regular internal pressure, and a regular load is applied to the tire. "Regular rim" refers to a rim defined by a standard for each tire according to a system of standards that includes standards with which tires comply, and is a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). In the system of standards including standards with which tires comply, "regular internal pressure" refers to air pressure defined by each of the standards for each tire and is "maximum air pressure" defined by JATMA, a maximum value indicated in the table "TIRE LOAD LIMITS AT VARIOUS COLD INFLATION PRESSURES" defined by TRA, or "INFLATION PRESSURE" defined by ETRTO. However, in a case where a tire is a tire for a passenger vehicle, "regular internal pressure" is 180 kPa. "Regular load" is a load defined by a standard for each tire according to a system of standards that includes standards with which tires comply, and is "maximum load capacity" defined by JATMA, a maximum value indicated in the table of "TIRE LOAD LIMITS AT VARIOUS COLD INFLATION PRESSURES" defined by TRA, or "LOAD CAPACITY" defined by ETRTO. However, in a case where a tire is a tire for a passenger vehicle, "regular load" corresponds to 88% of the load described above.

DETAILED DESCRIPTION

Hereinafter, configurations of embodiments of the present technology will be described in detail with reference to the accompanying drawings.

Figure 1:
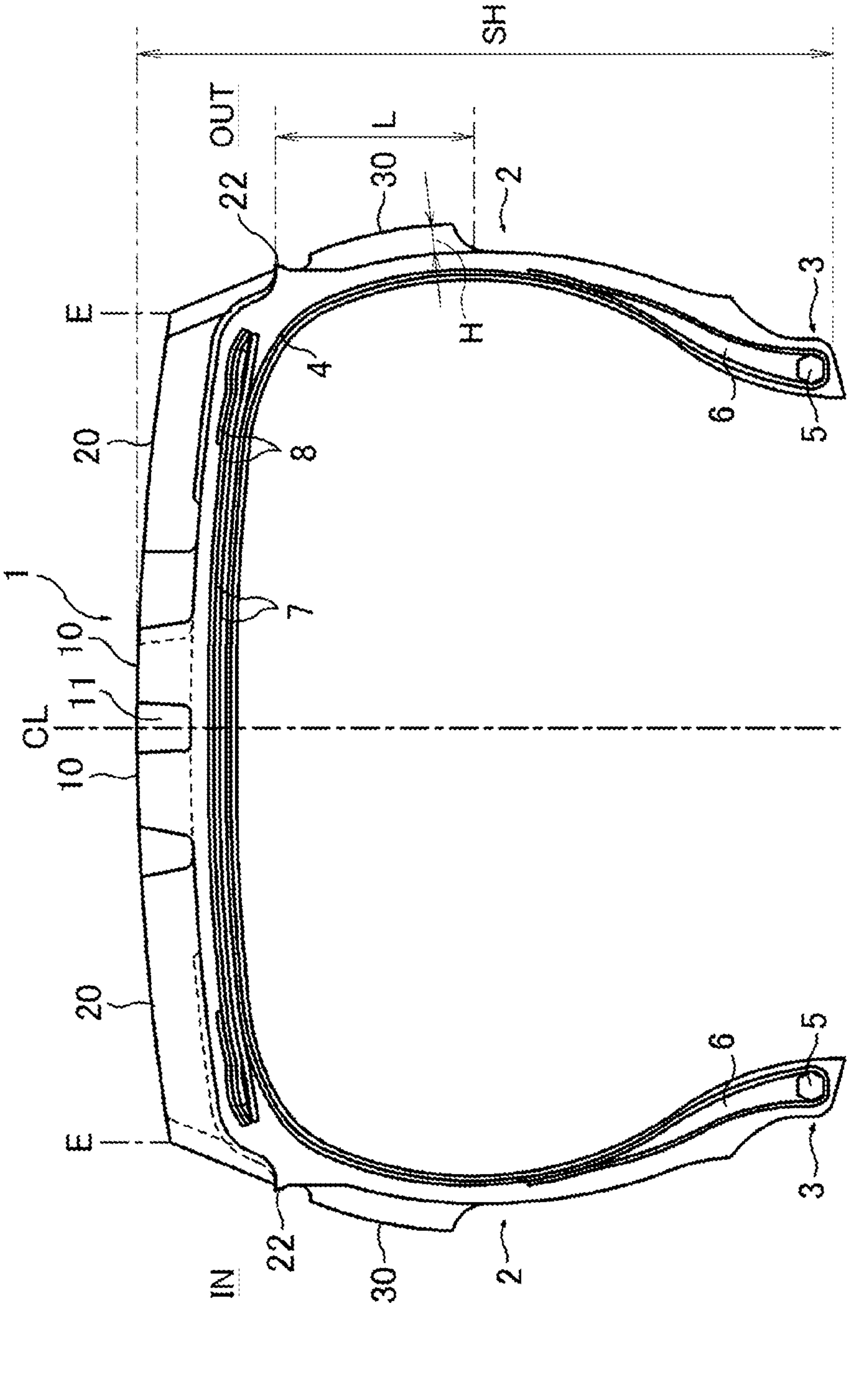
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 respectively disposed on both sides of the tread portion 1, and a pair of bead portions 3 each disposed on an inner side of the sidewall portions 2 in a tire radial direction. In FIG. 1, reference sign CL denotes a tire equator, and reference sign E denotes a ground contact edge. Note that FIG. 1 is a meridian cross-sectional view, and thus, although not illustrated, each of the tread portion 1, the sidewall portions 2, and the bead portions 3 extends in a tire circumferential direction and has an annular shape, and accordingly, a basic structure of a toroidal shape of the pneumatic tire is constituted. Hereinafter, although the description with reference to FIG. 1 is basically based on the illustrated meridian cross-sectional shape, any of respective tire components extends in the tire circumferential direction and has an annular shape.

The pneumatic tire of an embodiment of the present technology has a designated mounting direction with respect to a vehicle. Specifically, an IN side in the diagram is a side (hereinafter referred to as a vehicle inner side) designated to be an inner side with respect to the vehicle when the pneumatic tire is mounted on the vehicle, and an OUT side in the diagram is a side (hereinafter referred to as a vehicle outer side) designated to be an outer side with respect to the vehicle when the pneumatic tire is mounted on the vehicle. Such a mounting direction can be identified by looking at an indication provided at a discretionary site in a tire outer surface, for example.

A carcass layer 4 is mounted between the left-right pair of bead portions 3. The carcass layer 4 includes a plurality of lines of reinforcing cord extending in the tire radial direction, and is folded back around a bead core 5 disposed in each of the bead portions 3 from the vehicle inner side to the vehicle outer side. Additionally, a bead filler 6 is disposed on the periphery of the bead core 5, and is enveloped by a body portion and a folded back portion of the carcass layer 4. On the other hand, a plurality of belt layers 7 (two layers in FIG. 1) are embedded on an outer circumferential side of the carcass layer 4 in the tread portion 1. Each of the belt layers 7 includes a plurality of lines of reinforcing cord that are inclined with respect to the tire circumferential direction, and the reinforcing cord is disposed intersecting between the layers. In the belt layers 7, an inclination angle of the reinforcing cord with respect to the tire circumferential direction is set to be in the range of from, for example, 10° to 40°. Further, a belt reinforcing layer 8 is provided on an outer circumferential side of the belt layers 7. The belt reinforcing layer 8 includes organic fiber cord oriented in the tire circumferential direction. In the belt reinforcing layer 8, an angle of the organic fiber cord with respect to the tire circumferential direction is set, for example, to be from 0° to 5°.

An embodiment of the present technology is applied to such a pneumatic tire including a general cross-sectional structure; however, a basic structure of the pneumatic tire is not limited to the structure described above.

Figure 2:
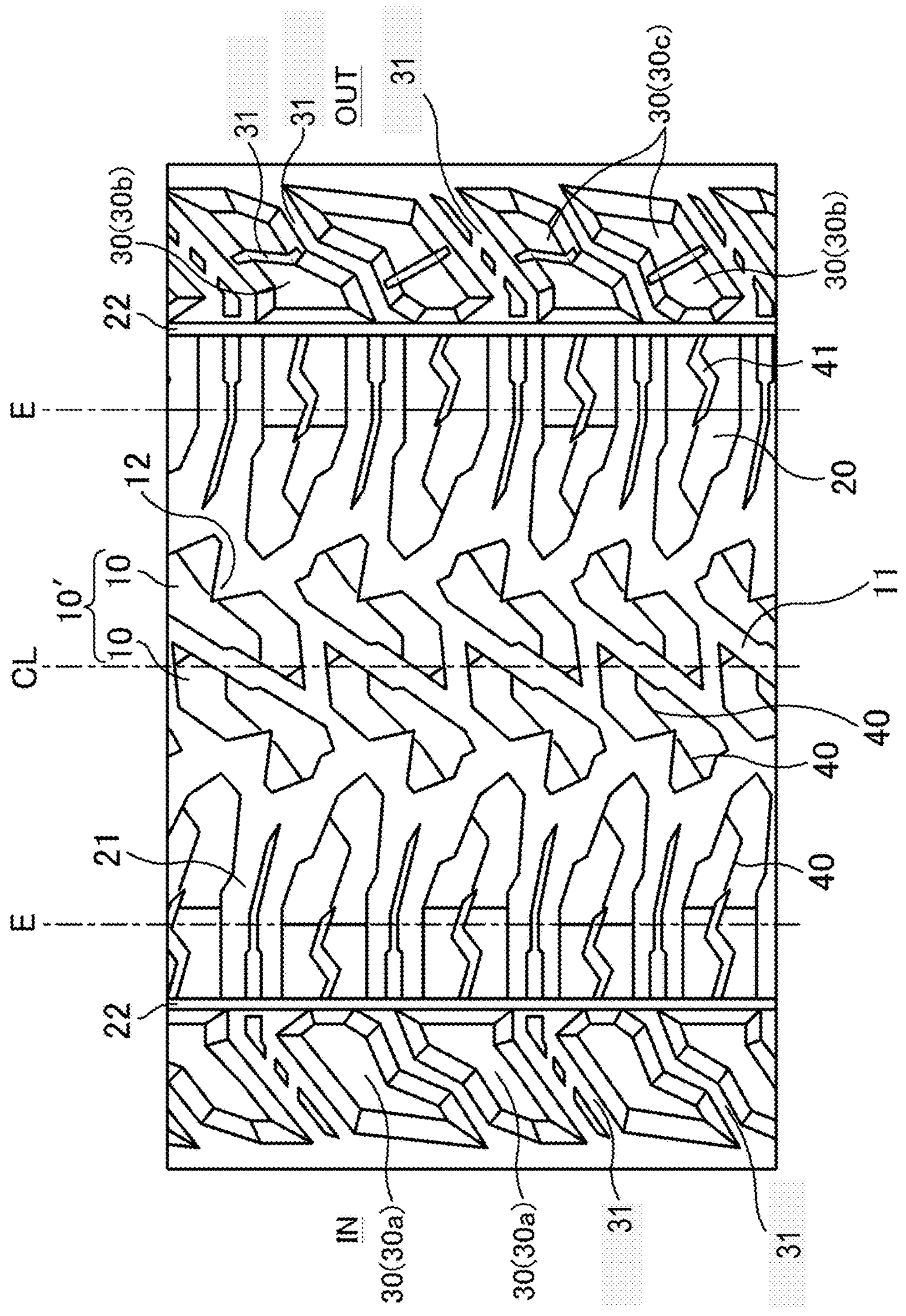
FIG. 2 is a front view illustrating a tread surface of a pneumatic tire according to an embodiment of the present technology.

In the pneumatic tire illustrated in FIGS. 1 and 2, a plurality of center blocks 10 are provided in a center region of an outer surface of the tread portion 1. Additionally, a plurality of shoulder blocks 20 are provided in a shoulder region of the outer surface of the tread portion 1. In other words, two types of blocks (the center blocks 10 and the shoulder blocks 20) are provided on each of both sides of the tire equator in the outer surface of the tread portion 1. Then, a region where the center blocks 10 located on the tire equator side are disposed is the center region, and a region where the shoulder blocks 20 located further on an outer side than the center blocks 10 in the tire width direction are disposed is the shoulder region.

The center blocks 10 are arranged in pairs (block pairs 10') and inclined grooves 11 extending at an incline with respect to the tire circumferential direction are interposed between the pairs of center blocks 10. Then, the center blocks 10 on one side of the block pairs 10' (a left side of the tire equator in the diagram) extend from one side (the left side of the tire equator in the diagram) to the other side (a right side of the tire equator in the diagram) of the tire equator across the tire equator. The center blocks 10 on the other side (the right side of the tire equator in the diagram) extend from the other side (the right side of the tire equator in the diagram) to the one side (the left side of the tire equator in the diagram) of the tire equator across the tire equator. Additionally, a notch 12 including two wall surfaces connected in a V-shape in a tread contact surface is provided in a wall surface (wall surface opposite to an inclined groove 30) on the outer side of each of the center blocks 10 in the tire width direction.

As described above, the shoulder blocks 20 are blocks disposed on the outer side of the center blocks 10 in the tire width direction. In the illustrated example, the plurality of shoulder blocks 20 extending from the outer side of the center blocks 10 in the tire width direction to the ground contact edge E are arranged at intervals in the tire circumferential direction. A shoulder groove 21 extending in the tire width direction is formed between the plurality of shoulder blocks 20. Note that in the following description, an outermost end portion in the tire width direction in the meridian cross-section of the shoulder blocks 20 is considered to be an outermost end portion in the tire width direction of the tread portion 1, and a region adjacent to the end portion is assumed to be a side region (a region where a side block 30 described below is formed). In the illustrated example, a protrusion 22 continuously extending over the entire circumference of the tire is provided in the outermost end portion in the tire width direction in the meridian cross-section of the shoulder blocks 20.

In the illustrated example, a sipe 40 is formed in each of the center blocks 10 and the shoulder blocks 20 as described above. Additionally, shallow grooves 41 extending while bending along the tire width direction are provided in side surfaces on an outer side of the shoulder blocks 20 in the tire width direction.

An embodiment of the present technology relates to a structure of the side block 30 described below provided in the side region that comes into contact with a road surface during running on unpaved roads (for example, when a tire is buried in mud or the like, or when a tire comes into contact with the ground in a state where a vehicle body is tilted). Thus, a structure of grooves and blocks formed between the outermost end portions in the tire width direction of the tread portion 1 is not particularly limited as long as a tread pattern mainly includes blocks and is suitable for running performance on unpaved roads as in the illustrated example.

A plurality of the side blocks 30 rising from an outer surface of the sidewall portion 2 are formed in the side region located on an outer side of the shoulder region in the tire width direction. A rising height H of the side blocks 30 is preferably from 5 mm to 13 mm. The plurality of side blocks 30 are arranged over the entire circumference of the tire along the tire circumferential direction. Particularly, in the illustrated example, the side blocks 30 are disposed at extension positions on the outer side of the shoulder blocks 20 in the tire width direction, and a groove between the side blocks 30 adjacent in the tire circumferential direction is substantially continuous with the shoulder groove 21 between the shoulder blocks 20 adjacent in the tire circumferential direction. A shape of an individual block of the side blocks 30 is not particularly limited, but preferably, the side blocks 30 adjacent in the tire circumferential direction at least partially overlap as viewed along the tire radial direction. For example, the side blocks 30 illustrated have a substantially L-shape in which a portion extending in the tire width direction and a portion extending in the tire circumferential direction are combined, and thus the side blocks 30 adjacent at least partially overlap.

The individual side block of the side blocks 30 is constituted by defining at least three directions by segmentation elements 31. In other words, a land portion rising from the outer surface of the sidewall portion 2 is defined by a plurality of the segmentation elements 31, and the side blocks 30 are formed. Segmentation elements 31 refer to any of the outermost end portion in the tire width direction of the tread portion 1, a groove extending in the tire circumferential direction or the tire width direction, and a sipe extending in the tire circumferential direction or the tire width direction. Additionally, in a case where the segmentation elements 31 are elements (a groove or a sipe) having a depth, the segmentation elements 31 have a depth that is not less than 40% of the rising height H of the side blocks 30. In other words, a groove or a sipe having a groove depth of less than 40% of the rising height of the side blocks 30 is not considered as the segmentation elements 31 that define the side blocks 30. A plurality of types of the segmentation elements 31 can be combined in a discretionary manner. For example, in the illustrated example, a side block **30*a* in which the outermost end portion in the tire width direction of the tread portion 1 and a pair of grooves extending in the tire width direction are formed as the segmentation elements 31 is formed in the side region on the vehicle inner side (hereinafter, referred to as an inner side region). Additionally, a side block 30*b* in which the outermost end portion in the tire width direction of the tread portion 1, a groove extending in the tire circumferential direction, and a pair of grooves extending in the tire width direction are formed as the segmentation elements 31, and a side block 30*c* in which a groove extending in the tire circumferential direction and a pair of grooves extending in the tire width direction are formed as the segmentation elements 31 are formed in the side region on the vehicle outer side (hereinafter, referred to as an outer side region). Note that regarding the segmentation elements 31, the outermost end portion in the tire width direction of the tread portion 1 does not have a depth unlike the grooves or the sipes, but in an embodiment of the present technology, the outermost end portion in the tire width direction of the tread portion 1 is considered as an element that defines the side blocks 30. For example, even in a case where the protrusion 22 continuously extending in the tire circumferential direction is present in the outermost end in the tire width direction of the tread portion 1, and the side blocks 30 are connected by the protrusion 22, the outermost end (that is, the protrusion 22) in the tire width direction of the tread portion 1 in an embodiment of the present technology is considered as the segmentation elements 31 that define the side blocks 30. Thus, individual portions excluding the protrusion 22 become the side blocks 30** that are separate.

In an embodiment of the present technology, the side blocks 30 are provided in each of the outer side region and the inner side region, and the number of the side blocks 30 provided in the outer side region differs from the number of the side blocks 30 provided in the inner side region. That is, assuming that the number of the side blocks 30 provided in the outer side region is Nout and the number of the side blocks 30 provided in the inner side region is Nin, the number Nout and the number Nin satisfy the relationship Nout>Nin. For example, in the illustrated example, since the side blocks 30 provided in the outer side region are more finely defined than the side blocks 30 provided in the inner side region, the number Nin is smaller than the number Nout.

In this manner, since the number of the side blocks 30 on the vehicle inner side and the number of the side blocks 30 on the vehicle outer side differ, and the number Nout of the side blocks 30 in the outer side region having a large effect on noise (wind noise) is relatively large (that is, the individual blocks are small), noise performance can be enhanced. Additionally, since the number of groove components is accordingly increased, running performance on unpaved roads (particularly snow-covered road surfaces) can also be improved. On the other hand, since the number Nin of the side blocks 30 in the inner side region having a small effect on noise (wind noise) is relatively small (that is, the individual blocks are large), cut resistance can be enhanced, and accordingly, running performance on unpaved roads can be improved.

Particularly, on unpaved roads, since the tire is sunk or the vehicle body is tilted, and a cut is also likely to occur on the vehicle inner side that is not exposed to the vehicle outer side, cut resistance can be improved effectively. Functions are shared on the vehicle inner side and the vehicle outer side in this manner, and thus noise performance and running performance on unpaved roads can be provided in a well-balanced manner.

As described above, the number of the side blocks 30 on the vehicle inner side and the number of the side blocks 30 on the vehicle outer side differ, and total area of the side blocks 30 provided in the inner side region is preferably from 85% to 115% of total area of the side blocks 30 provided in the outer side region. The total area of the side blocks 30 is set to be an identical extent on the vehicle inner side and the vehicle outer side in this manner, and thus the individual block of the side blocks 30 can be made large reliably by making the number Nin relatively small and cut resistance can be improved, and the individual block of the side blocks 30 can be made small reliably by making the number Nout relatively large and noise performance can be improved. In this case, when the relationship between the total area of the side blocks 30 on the vehicle inner side and the total area of the side blocks 30 on the vehicle outer side is outside the range described above, it becomes difficult to set the shapes (sizes) of the side blocks 30 on the vehicle inner side and the vehicle outer side in appropriate relationship by adjusting the number of the side blocks 30 alone. Note that in an embodiment of the present technology, total area of side blocks 30 refers to a sum of area of top surfaces of the side blocks 30.

The side blocks 30 are provided, and a percentage of the total area of the side blocks 30 provided in each of the inner side region and the outer side region with respect to the area of each of the side regions may preferably be set to be from 15% to 70% in each of the inner side region and the outer side region, and thus the side blocks 30 effectively act on running performance on unpaved roads. In this manner, the side blocks 30 occupy a sufficient range of the side regions, and thus running performance on unpaved roads can be exerted effectively. When the percentage of the total area of the side blocks 30 is less than 15%, since the side blocks 30 are sparsely scattered, it becomes difficult to sufficiently improve running performance on unpaved roads. When the percentage of the total area of the side blocks 30 exceeds 70%, since area of the grooves and the sipes between the side blocks 30 decreases and an edge effect is difficult to obtain, it becomes difficult to sufficiently improve running performance on unpaved roads. Additionally, when the individual block of the side blocks 30 is too small, since it becomes difficult to obtain an edge effect sufficient for exerting running performance on unpaved road surfaces, the area of the individual block of the side blocks 30 is preferably, for example, not less than 4% of the area of the side region. Note that in an embodiment of the present technology, the area of side region refers to the area of a region between the outermost end portion in the tire width direction of the tread portion 1 and an outermost end in the tire width direction of the side blocks 30.

Figure 3A:
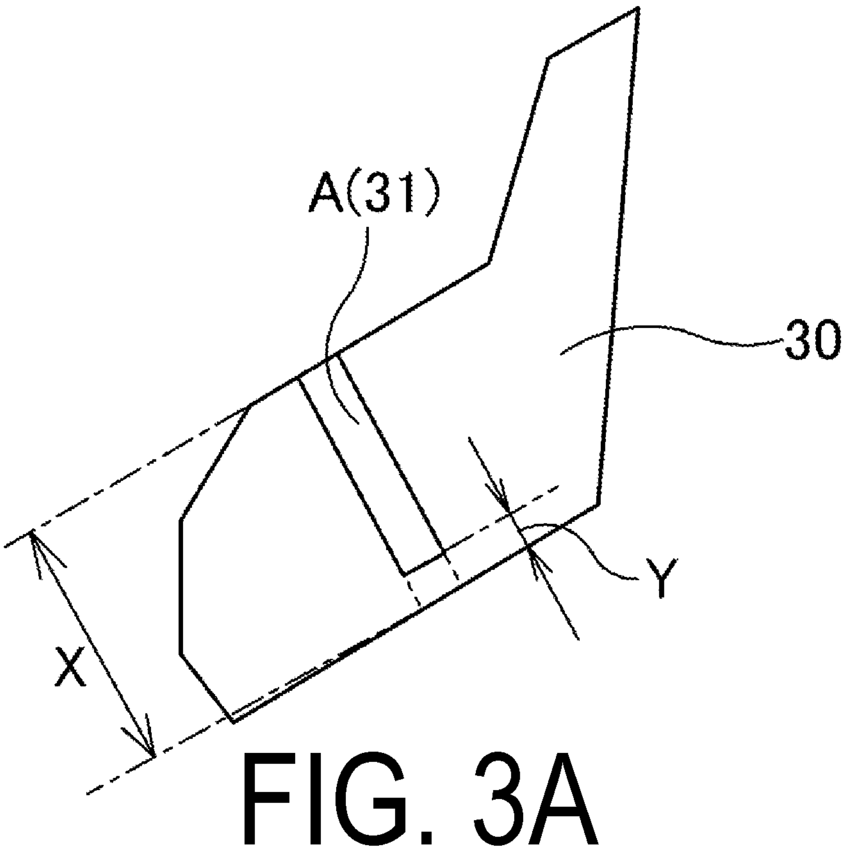
FIGS. 3A and 3B are schematic diagrams explaining a segmentation element.
Figure 3B:
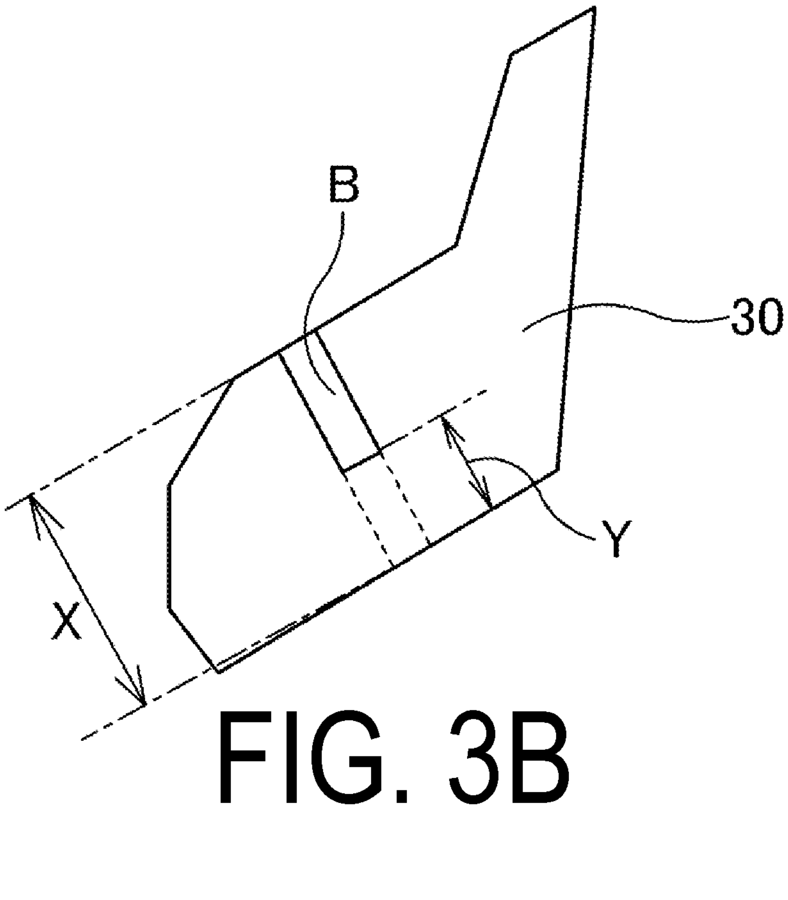

In an embodiment of the present technology, the side blocks 30 are defined by the segmentation elements 31, but the entire circumference of the side blocks 30 is not required to be completely defined (segmented). For example, in two types of the side blocks 30 schematically illustrated in FIGS. 3A and 3B, a groove A and a groove B that terminate in the blocks are formed, respectively. Among these, as illustrated in FIG. 3A, in a case where the groove A has a sufficient length, the groove A can be considered as the segmentation element 31. That is, when a percentage of a length Y of a portion not segmented by the groove A with respect to a length X of an imaginary groove (see a dashed line in the diagram) in which the groove A (the segmentation element 31) extends is less than 15%, the groove A (the segmentation element 31) substantially segments the block, and portions of the block located on both sides of the groove A (the segmentation element 31) can be considered as being defined as separate blocks. On the other hand, in a case where the groove B is short as in FIG. 3B (in a case where the percentage of the length described above is not less than 15%), the block is considered as not being segmented.

The number Nin of the side blocks 30 provided in the inner side region is preferably not less than 25, and more preferably not less than 30 and not greater than 45. Additionally, a ratio Nout/Nin of the number Nout of the side blocks 30 provided in the outer side region to the number Nin of the side blocks 30 provided in the inner side region is preferably not less than 1.5 and not greater than 3.5. The number of the side blocks 30 is set in this manner, and thus a balance of the number and the size of the side blocks 30 on each of the sides becomes good, and this becomes advantageous in providing noise performance and running performance on unpaved roads in a compatible manner. When the number Nin of the side blocks 30 is less than 25, since the number of the side blocks 30 is too small, it becomes difficult to sufficiently improve running performance (particularly, cut resistance) on unpaved roads. When the ratio Nout/Nin is less than 1.5, a difference in the number of the side blocks 30 on the vehicle inner side and the vehicle outer side becomes small, and an effect of making the number of the side blocks 30 differ on the vehicle inner side and the vehicle outer side is not sufficiently obtained. When the ratio Nout/Nin exceeds 3.5, since the number of the side blocks is too large or too small on any of the vehicle inner side or the vehicle outer side, it becomes difficult to exert noise performance and running performance on unpaved roads in a well-balanced manner.

The side blocks 30 are provided in the side regions adjacent to the shoulder regions, and a ratio L/SH of a vertical distance L from the outermost end portion in the tire width direction of the tread portion 1 to an innermost point in the tire radial direction of the side region to a tire cross-sectional height SH may preferably be from 0.10 to 0.30. The range of the side regions provided with the side blocks 30 is set in this manner, and thus the side blocks 30 appropriately come into contact with a road surface during running on unpaved roads, and this becomes advantageous in effectively exerting running performance on unpaved roads. When the ratio L/SH is less than 0.10, since the range where the side blocks 30 are provided becomes small, an effect of improving running performance on unpaved roads cannot be obtained sufficiently. When the ratio L/SH exceeds 0.30, since the range where the side blocks 30 are provided becomes large, and an effect of a weight increase due to the side blocks 30 increases, there is concern that noise performance (wind noise) and normal running performance (steering stability performance) may be affected.

The segmentation elements 31 defining the side blocks 30 preferably partially include a shallow grooved region having a relatively small groove depth. The shallow grooved region can be constituted by making at least a portion of the groove or the sipe that is the segmentation element 31 shallow. The groove depth of the shallow grooved region is preferably from 40% to 45% of the rising height H of the side blocks 30. Additionally, a total length of the shallow grooved region along a contour line of a road contact surface of the side blocks 30 is preferably from 15% to 35% of the entire length of the contour line of the road contact surface of the side blocks 30. Accordingly, groove volume and block rigidity can be ensured in a well-balanced manner, and this becomes advantageous in providing noise performance and running performance on unpaved roads in a compatible manner. When the groove depth of the shallow grooved region is less than 40% of the rising height H, the blocks are not sufficiently segmented in the shallow grooved region, and there is concern that the side blocks 30 cannot be defined appropriately. When the groove depth of the shallow grooved region exceeds 45% of the rising height H, the groove depth in the shallow grooved region does not become sufficiently shallow, and an effect of providing the shallow grooved region does not become exerted sufficiently. When the total length of the shallow grooved region is less than 15% of the entire length of the contour line of the road contact surface of the side blocks 30, the shallow grooved region becomes too small, and thus the effect of providing the shallow grooved region does not become exerted sufficiently. When the total length of the shallow grooved region exceeds 35% of the entire length of the contour line of the road contact surface of the side blocks 30, the shallow grooved region becomes too large, and the blocks are not sufficiently segmented and there is concern that the side blocks 30 cannot be defined appropriately.

EXAMPLE

Nineteen types of pneumatic tires according to Comparative Examples 1 to 3 and according to Examples 1 to 16 were manufactured. The tires have a tire size of LT265/70R17, and include the basic structure illustrated in FIG. 1. The tires are based on the tread pattern of FIG. 2, and the tires are set for the number Nout of the side blocks in the outer side region, the number Nin of the side blocks in the inner side region, the ratio Nout/Nin of the number of the side blocks, the rising height H of the side blocks, the ratio L/SH of the vertical distance L from the outermost end portion in the tire width direction of the tread portion to the innermost point in the tire radial direction of the side region to the tire cross-sectional height SH, the presence of the shallow grooved region, the percentage of the groove depth of the shallow grooved region with respect to the rising height H, and the percentage of the total length of the shallow grooved region with respect to the entire length of the contour line of the road contact surface of the side blocks indicated in Tables 1 and 2.

As for the pneumatic tires, running performance (mud performance and snow performance) on unpaved roads and noise performance on a normal road surface were evaluated by the following evaluation method, and the results are also indicated in Tables 1 and 2.

Mud Performance

The test tires were mounted on wheels having a rim size of 17×7.0J, inflated to air pressure of 250 kPa, and mounted on a test vehicle (four wheel drive vehicle), and sensory evaluation on traction characteristics was performed by a test driver on a test course including on muddy ground. Evaluation results are expressed as index values with a value of Comparative Example 1 being assigned as the value of 100. The larger index values mean excellent mud performance.

Snow Performance

The test tires were mounted on wheels having a rim size of 17×7.0J, inflated to air pressure of 250 kPa, and mounted on a test vehicle (four wheel drive vehicle), and sensory evaluation on traction characteristics was performed by a test driver on a test course including bad roads and snowy road surfaces. Evaluation results are expressed as index values with a value of Comparative Example 1 being assigned as the value of 100. The larger index values mean excellent snow performance.

Noise Performance

The test tires were mounted on wheels having a rim size of 17×7.0J, inflated to air pressure of 250 kPa, and mounted on a test vehicle (four wheel drive vehicle), and sensory evaluation on noise performance (wind noise) was performed by a test driver on a test course including a paved road surface. Evaluation results are expressed as index values with a value of Comparative Example 1 being assigned as the value of 100. The larger index values mean excellent noise performance.

TABLE 1-1

| | | | Comparative Example 1 | Comparative Example 2 | Comparative Example 3 |
|---|---|---|---|---|---|
| Number Nin | | | 40 | 30 | 50 |
| Number Nout | | | 40 | 30 | 50 |
| Ratio Nout/Nin | | | 1.0 | 1.0 | 1.0 |
| Rising height H | | mm | 8 | 8 | 8 |
| Ratio L/SH | | | 0.2 | 0.2 | 0.2 |
| Shallow grooved region | Presence of shallow grooved region | | No | No | No |
| | Percentage of groove depth | % | — | — | — |
| | Percentage of total length | % | — | — | — |
| Mud Performance | | Index value | 100 | 102 | 99 |
| Snow performance | | Index value | 100 | 103 | 99 |
| Noise performance | | Index value | 100 | 99 | 105 |

TABLE 1-2

| | | | Example 1 | Example 2 | Example 3 | Example 4 |
|---|---|---|---|---|---|---|
| Number Nin | | | 30 | 25 | 25 | 30 |
| Number Nout | | | 50 | 50 | 80 | 50 |
| Ratio Nout/Nin | | | 1.7 | 2.0 | 3.2 | 1.7 |
| Rising height H | | mm | 8 | 8 | 8 | 8 |
| Ratio L/SH | | | 0.2 | 0.2 | 0.2 | 0.08 |
| Shallow grooved region | Presence of shallow grooved region | | No | No | No | No |
| | Percentage of groove depth | % | — | — | — | — |
| | Percentage of total length | % | — | — | — | — |
| Mud Performance | | Index value | 102 | 102 | 101 | 101 |
| Snow performance | | Index value | 103 | 103 | 102 | 102 |
| Noise performance | | Index value | 105 | 104 | 104 | 104 |

TABLE 1-3

| | | | Example 5 | Example 6 | Example 7 |
|---|---|---|---|---|---|
| Number Nin | | | 30 | 30 | 30 |
| Number Nout | | | 50 | 50 | 50 |
| Ratio Nout/Nin | | | 1.7 | 1.7 | 1.7 |
| Rising height H | | mm | 8 | 8 | 8 |
| Ratio L/SH | | | 0.1 | 0.3 | 0.32 |
| Shallow grooved region | Presence of shallow grooved region | | No | No | No |
| | Percentage of groove depth | % | — | — | — |
| | Percentage of total length | % | — | — | — |
| Mud Performance | | Index value | 102 | 102 | 101 |
| Snow performance | | Index value | 103 | 103 | 102 |
| Noise performance | | Index value | 105 | 105 | 104 |

TABLE 2-1

| | | | Example 8 | Example 9 | Example 10 |
|---|---|---|---|---|---|
| Number Nin | | | 30 | 30 | 30 |
| Number Nout | | | 50 | 50 | 50 |
| Ratio Nout/Nin | | | 1.7 | 1.7 | 1.7 |
| Rising height H | | mm | 4 | 5 | 13 |
| Ratio L/SH | | | 0.2 | 0.2 | 0.2 |
| Shallow grooved region | Presence of shallow grooved region | | No | No | No |
| | Percentage of groove depth | % | — | — | — |
| | Percentage of total length | % | — | — | — |
| Mud Performance | | Index value | 101 | 102 | 102 |
| Snow performance | | Index value | 102 | 103 | 103 |
| Noise performance | | Index value | 104 | 105 | 105 |

TABLE 2-2

| | | | Example 11 | Example 12 | Example 13 |
|---|---|---|---|---|---|
| Number Nin | | | 30 | 30 | 30 |
| Number Nout | | | 50 | 50 | 50 |
| Ratio Nout/Nin | | | 1.7 | 1.7 | 1.7 |
| Rising height H | | mm | 15 | 15 | 15 |
| Ratio L/SH | | | 0.2 | 0.2 | 0.2 |
| Shallow grooved region | Presence of shallow grooved region | | No | Yes | Yes |
| | Percentage of groove depth | % | — | 40 | 40 |
| | Percentage of total length | % | — | 40 | 35 |
| Mud Performance | | Index value | 101 | 101 | 103 |
| Snow performance | | Index value | 102 | 102 | 104 |
| Noise performance | | Index value | 104 | 104 | 106 |

TABLE 2-3

| | | | Example 14 | Example 15 | Example 16 |
|---|---|---|---|---|---|
| Number Nin | | | 30 | 30 | 30 |
| Number Nout | | | 50 | 50 | 50 |
| Ratio Nout/Nin | | | 1.7 | 1.7 | 1.7 |
| Rising height H | | mm | 15 | 15 | 15 |
| Ratio L/SH | | | 0.2 | 0.2 | 0.2 |
| Shallow grooved region | Presence of shallow grooved region | | Yes | Yes | Yes |
| | Percentage of groove depth | % | 40 | 40 | 45 |
| | Percentage of total length | % | 25 | 15 | 25 |
| Mud Performance | | Index value | 104 | 104 | 105 |
| Snow performance | | Index value | 105 | 105 | 105 |
| Noise performance | | Index value | 107 | 107 | 107 |

As can be seen from Tables 1 and 2, as compared with Comparative Example 1, any of Examples 1 to 16 provided effectively improved running performance on unpaved roads (mud performance and snow performance) and noise performance in a well-balanced manner. Note that in the evaluation described above, muddy ground and snowy road surfaces were used as unpaved roads, but even on other road surfaces (sandy ground, rocky ground surfaces and the like), the side blocks of an embodiment of the present technology effectively act on sand, stones, rocks, and the like on a road surface, and thus good running performance was also exerted on any unpaved road surface. On the other hand, in Comparative Example 2, since the number of the side blocks is small on the vehicle inner side and the vehicle outer side, running performance on unpaved roads was obtained, but noise performance was reduced. In Comparative Example 3, since the number of the side blocks is large on the vehicle inner side and the vehicle outer side, noise performance was obtained, but running performance on unpaved roads was reduced.

The invention claimed is:

1. A pneumatic tire, comprising:

a tread portion extending in a tire circumferential direction and having an annular shape, the tread portion having a symmetrical pattern across an equator;

a pair of sidewall portions respectively disposed on both sides of the tread portion; and a pair of bead portions each disposed on an inner side of the pair of sidewall portions in a tire radial direction, the pneumatic tire having a designated mounting direction with respect to a vehicle;

a plurality of side blocks being arranged along the tire circumferential direction in each of side regions adjacent to an outer side in a tire width direction of an outermost end portion in the tire width direction of the tread portion, the side blocks rising from outer surfaces of the sidewall portions and the side blocks of only one of the side regions being defined by a groove that extends into and terminates in the side blocks, the groove extending in the tire circumferential direction or the tire width direction, the groove defining the side blocks of the one of the side regions extending less than a full width of the side blocks of the one of the side regions across an outermost surface of the side blocks of the one of the side regions, and among the side regions, a side that is an inner side with respect to the vehicle when the pneumatic tire is mounted on the vehicle is an inner side region, and a side that is an outer side with respect to the vehicle when the pneumatic tire is mounted on the vehicle is an outer side region, a number Nin of the side blocks provided in the inner side region being smaller than a number Nout of the side blocks provided in the outer side region.

2. The pneumatic tire according to claim 1, wherein the side blocks adjacent in the tire circumferential direction at least partially overlap as viewed along a tire radial direction.

3. The pneumatic tire according to claim 1, wherein the number Nin of the side blocks provided in the inner side region is not less than 25, and a ratio Nout/Nin of the number Nout of the side blocks provided in the outer side region to the number Nin of the side blocks provided in the inner side region is not less than 1.5 and not greater than 3.5.

4. The pneumatic tire according to claim 1, wherein a ratio L/SH of a vertical distance L from the outermost end portion in the tire width direction of the tread portion to an innermost point in the tire radial direction of one of the side regions to a tire cross-sectional height SH is from 0.10 to 0.30.

5. The pneumatic tire according to claim 1, wherein a rising height of the side blocks from the outer surfaces of the sidewall portions is from 5 mm to 13 mm.

6. The pneumatic tire according to claim 1, wherein
the groove has a relatively small groove depth,
the groove depth of the groove is from 40% to 45% of a rising height of the side blocks from the outer surfaces of the sidewall portions, and
a total length of the groove along a contour line of a road contact surface of the side blocks is from 15% to 35% of an entire length of the contour line of the road contact surface of the side blocks.

7. The pneumatic tire according to claim 1, wherein a total area of the side blocks provided in the outer side region is from 85% to 115% of a total area of the side blocks provided in the inner side region.

8. The pneumatic tire according to claim 1, wherein, in each of the inner side region and the outer side region, a percentage of a total area of the side blocks provided in each of the side regions with respect to an area of each of the side regions is from 15% to 70%.

9. The pneumatic tire according to claim 2, wherein the number Nin of the side blocks provided in the inner side region is not less than 25, and a ratio Nout/Nin of the number Nout of the side blocks provided in the outer side region to the number Nin of the side blocks provided in the inner side region is not less than 1.5 and not greater than 3.5.

10. The pneumatic tire according to claim 2, wherein a ratio L/SH of a vertical distance L from the outermost end portion in the tire width direction of the tread portion to an innermost point in the tire radial direction of one of the side regions to a tire cross-sectional height SH is from 0.10 to 0.30.

11. The pneumatic tire according to claim 10, wherein a rising height of the side blocks from the outer surfaces of the sidewall portions is from 5 mm to 13 mm.

12. The pneumatic tire according to claim 11, wherein
the groove has a relatively small groove depth,
the groove depth of the groove is from 40% to 45% of the rising height of the side blocks from the outer surfaces of the sidewall portions, and
a total length of the groove along a contour line of a road contact surface of the side blocks is from 15% to 35% of an entire length of the contour line of the road contact surface of the side blocks.

13. The pneumatic tire according to claim 12, wherein a total area of the side blocks provided in the outer side region is from 85% to 115% of a total area of the side blocks provided in the inner side region.

14. The pneumatic tire according to claim 13, wherein, in each of the inner side region and the outer side region, a percentage of a total area of the side blocks provided in each of the side regions with respect to an area of each of the side regions is from 15% to 70%.

* * * * *